(12) United States Patent
Goujon et al.

(10) Patent No.: US 10,353,100 B2
(45) Date of Patent: Jul. 16, 2019

(54) PROCESSING SEISMIC DATA TO ATTENUATE VIBRATION NOISE (71) Applicant: WESTERNGECO L.L.C., Houston, TX (US)

(72) Inventors: Nicolas Goujon, Oslo (NO); Johan O. A. Robertsson, Wald ZH (CH); Ahmet Kemal Ozdemir, Asker (NO)

(73) Assignee: WESTERNGECO L.L.C., Houston, TX (US)

( * ) Notice: Subject to any disclaimer, the term of this patent is extended or adjusted under 35 U.S.C. 154(b) by 982 days.

(21) Appl. No.: 13/848,490

(22) Filed: Mar. 21, 2013

(65) Prior Publication Data

US 2014/0286127 A1 Sep. 25, 2014

(51) Int. Cl.
*G01V 1/38* (2006.01)

(52) U.S. Cl.
CPC .......... *G01V 1/38* (2013.01); *G01V 2210/144* (2013.01); *G01V 2210/32* (2013.01); *G01V 2210/3246* (2013.01); *G01V 2210/34* (2013.01)

(58) Field of Classification Search
CPC ................... G01V 1/36; G01V 1/3817; G01V 2210/3246; G01V 2210/32; G01V 1/38; G01V 2210/34; G01V 2210/144
USPC ....................................................... 367/21, 24
See application file for complete search history.

(56) References Cited

U.S. PATENT DOCUMENTS

| | | | | |
|---|---|---|---|---|
| 5,251,183 A | * | 10/1993 | McConnell | G01V 1/364 367/21 |
| 7,864,628 B2 | * | 1/2011 | Sitton | G01V 1/28 367/24 |
| 2007/0265786 A1 | | 11/2007 | Ozdemir et al. | |
| 2008/0008036 A1 | | 1/2008 | Morley | |
| 2009/0040870 A1 | * | 2/2009 | Kamata | 367/14 |
| 2009/0092003 A1 | | 4/2009 | Goujon et al. | |
| 2009/0296521 A1 | | 12/2009 | Perciot et al. | |
| 2010/0002541 A1 | | 1/2010 | Ozdemir et al. | |
| 2010/0195439 A1 | * | 8/2010 | Muyzert | 367/56 |
| 2010/0202251 A1 | | 8/2010 | Ozdemir et al. | |
| 2013/0343155 A1 | * | 12/2013 | Ozdemir | G01V 1/3808 367/24 |
| 2014/0219053 A1 | * | 8/2014 | Goujon et al. | 367/38 |
| 2015/0109882 A1 | * | 4/2015 | Rentsch-Smith | G01V 1/364 367/14 |

FOREIGN PATENT DOCUMENTS

GB 240122 11/1925

OTHER PUBLICATIONS

International Search Report and Written Opinion of PCT Application No. PCT/US2014/031274 dated Aug. 1, 2014: pp. 1-15.

* cited by examiner

*Primary Examiner* — Ian J Lobo
(74) *Attorney, Agent, or Firm* — Kevin B. McGoff (57) ABSTRACT A technique includes receiving first data acquired by at least a particle motion gradient sensor or a rotation sensor of a streamer that is subject to vibration due to towing of the streamer; and receiving second data acquired by at least one particle motion sensor of the streamer and being indicative of particle motion and vibration noise. The technique includes processing the second data in a processor-based machine to, based at least in part on the first data, attenuate the vibration noise indicated by the second data to generate third data indicative of the particle motion.

15 Claims, 8 Drawing Sheets

PROCESSING SEISMIC DATA TO ATTENUATE VIBRATION NOISE

BACKGROUND

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

The following is a brief description of various combinations of embodied features and is not meant to unduly limit any present or subsequent claims in this application.

According to a combination of various embodied features, a technique includes receiving first data acquired by at least a particle motion gradient sensor or a rotation sensor of a streamer that is subject to vibration due to towing of the streamer; and receiving second data acquired by at least one particle motion sensor of the streamer and being indicative of particle motion and vibration noise. The technique includes processing the second data in a processor-based machine to, based at least in part on the first data, attenuate the vibration noise indicated by the second data to generate third data indicative of the particle motion.

According to another combination of various embodied features, a technique includes receiving first data acquired by at least one particle motion sensor of a streamer that is subject to vibration due to towing of the streamer and receiving second data acquired by at least one particle motion gradient sensor of the streamer. The technique includes processing the first data in a processor-based machine to, based at least in part on the second data, attenuate the vibration noise indicated by the first data to generate third data indicative of the particle motion.

According to another combination of various embodied features, a technique includes receiving first data acquired by at least one particle motion sensor of a streamer that is subject to vibration induced by towing of the streamer; and receiving second data acquired by at least one rotation sensor of the streamer. The technique includes processing the first data in a processor-based machine to, based at least in part on the second data, attenuate the vibration noise indicated by the first data to generate third data indicative of the particle motion.

Other aspects of these and other combinations of embodied features will become apparent from the following drawings, descriptions and claims.

BRIEF DESCRIPTION OF THE DRAWINGS

The following is a brief description of the figures showing various combinations of embodied features. This brief description is to aid the understanding of one skilled in the art and is not meant in any way to unduly limit the scope of any present or future claims.

DETAILED DESCRIPTION

The following detailed description is meant to help the understanding of one skilled in the art with respect to various combinations of embodied features. It is not meant in any way to unduly limit any present or future claim scope.

Figure 1:
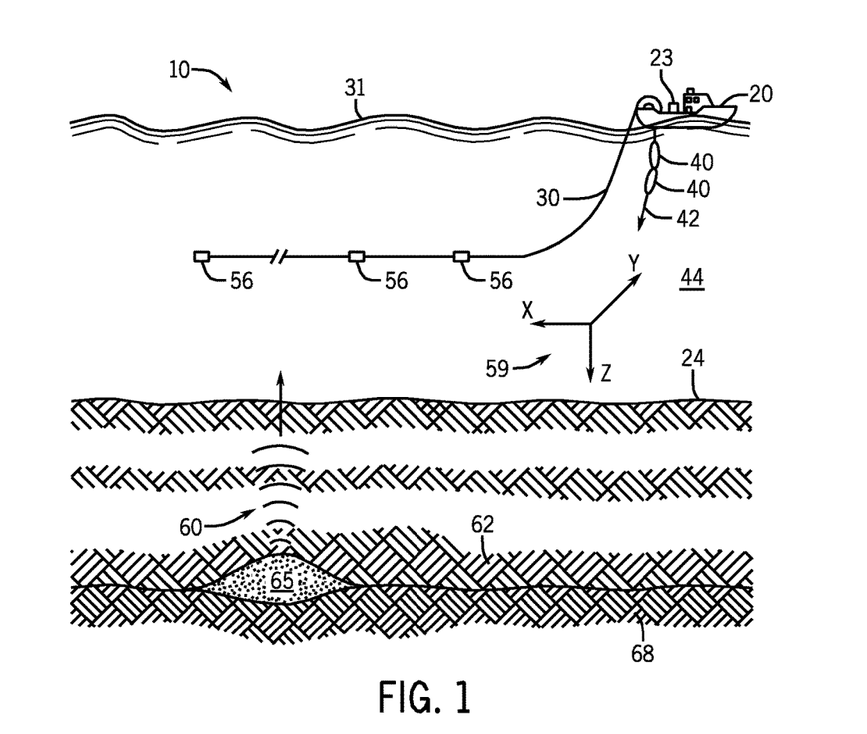
FIG. 1 is a schematic diagram of a marine-based seismic acquisition system.

FIG. 1 depicts an implementation 10 of a marine-based seismic data acquisition system. In the system 10, a survey vessel 20 tows one or more seismic streamers 30 (one exemplary streamer 30 being depicted in FIG. 1) that are disposed behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensor units 56, which may be, depending on the particular implementation, hydrophones to acquire pressure data or multi-component sensors. In some implementations, as further described herein, the sensor units 56 may contain multi-component sensors. In this regard, different sensors of a given seismic sensor unit 56 may be capable of detecting a pressure wavefield and at least one component of a particle motion that is associated with acoustic signals that are proximate to the sensor. Particle motions may include one or more components of a particle displacement, one or more components (inline (x), crossline (y) and vertical (z) components (see axes 59, for example)) of a particle velocity and one or more components of a particle acceleration.

Depending on the particular implementation, the multi-component seismic sensor may include one or more hydrophones, geophones, particle displacement sensors, particle velocity sensors, accelerometers, pressure gradient sensors or combinations thereof.

In accordance with some implementations, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 1) or may be implemented as a plurality of devices, depending on the particular implementation. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure derivative with respect to the inline direction, and another one of the pressure gradient sensors may acquire, at a particular point, seismic data indicative of the pressure derivative with respect to the vertical direction.

The marine seismic data acquisition system 10 includes seismic sources 40 (two exemplary seismic sources 40 being depicted in FIG. 1), such as air guns and the like. In some implementations, the seismic sources 40 may be coupled to, or towed by, the survey vessel 20. Alternatively, in other implementations, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (as depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as formation 65 that is depicted in FIG. 1.

The incident acoustic signals 42 that are created by the sources 40 produce corresponding reflected acoustic signals, or pressure waves 60, which are sensed by the seismic sensor units 56. It is noted that the seismic waves that are received and sensed by the seismic sensor units 56 include "up going" seismic waves that propagate to the sensor units 56 after reflections at the subsurface, as well as "down going" seismic waves that are produced by reflections of the pressure waves 60 from an air-water boundary, or free surface 31.

The seismic sensor units 56 generate signals (which can be digital signals), called "traces," which indicate the acquired measurements of the pressure wavefield and particle motion. The traces are recorded and may be at least partially processed by a signal processing unit 23 that is deployed on the survey vessel 20, in accordance with some implementations. For example, a particular seismic sensor unit 56 may provide a trace, which corresponds to a measure of a pressure wavefield by its hydrophone; and the sensor unit 56 may provide (depending on the particular implementation) one or more traces that correspond to one or more components of particle motion.

The goal of the seismic acquisition is to build up an image of a survey area for purposes of identifying subterranean geological formations, such as the geological formation 65. Subsequent analysis of the representation may reveal probable locations of hydrocarbon deposits in subterranean geological formations. Depending on the particular implementation, portions of the analysis of the representation may be performed on the seismic survey vessel 20, such as by the signal processing unit 23. In accordance with other implementations, the representation may be processed by a seismic data processing system that may be located on land or on the vessel 20. Thus, many variations are possible and are within the scope of the claims.

The particle motion measurements that are acquired by the streamer's particle motion sensors may indicate not only the sensed particle motion but also vibration noise due to the transverse vibrations that are generated on the streamer while the streamer is being towed through the water. Techniques and systems are disclosed herein for purposes of attenuating the vibration noise in particle motion measurements using data acquired from streamer-disposed rotation sensors and/or particle motion gradient sensors.

Figure 2:
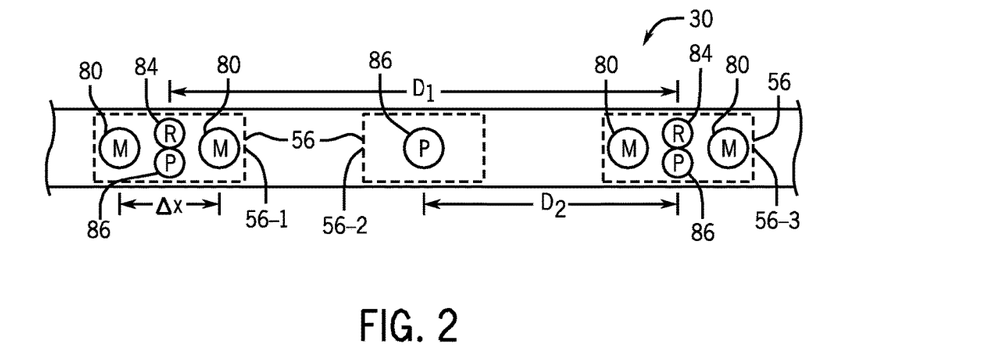
FIG. 2 is a schematic diagram illustrating sensors of the streamer of FIG. 1.

FIG. 2 illustrates an arrangement of particle motion 80 sensors, pressure 86 sensors and rotation 84 sensors of the streamer 30, in accordance with various embodiments. As depicted in FIG. 2, the number and types of sensors inside the seismic sensor units 56 as well as the spacing between the seismic sensor units 56 may vary along the length of the streamer 30. FIG. 2 depicts three exemplary seismic sensor units 56-1, 56-2 and 56-3 to illustrate a pattern of sensors, which is replicated along the length of the streamer 30.

The streamer 30 contains two types of seismic streamer units 56: a first type illustrated by seismic sensor unit 56-1, 56-3; and a second type illustrated by seismic sensor unit 56-2. The seismic sensor units 56-1 and 56-3 are spaced apart by a distance $D_1$; and each of these seismic sensor units 56 contains two particle motion sensors 80, a pressure sensor 86 (such as a hydrophone) and a rotation sensor 84. The seismic sensor unit 56-2, which includes a pressure sensor 86 is disposed between the seismic sensor units 56-1 and 56-3 and is spaced apart from either unit 56-1, 56-3 by a distance $D_2$.

The seismic sensor 86 may or may not be employed, depending on the particular implementation. In this manner, the seismic sensor units may contain a combination of different sensors, such as sensor units 56-1 and 56-3. Also, the pressure sensor 86 (hydrophone) in the sensor units 56-1 and 56-3 may or may not be co-located with the particle motion sensors 80 of the units 56-1 and 56-3: pressure and particle motion sensors locations may be independent. It is noted that FIG. 2 depicts a two-dimensional (2-D) schematic. In a 3-D case, the particle motion sensors 80 may each be a two component (2C) sensor (a particle motion sensor that acquired measurements in the vertical and crossline directions) or a three component (3C) particle motion sensor, which acquires measurements along all three axes 59 (see FIG. 1). Moreover, for the arrangement depicted in FIG. 2, the rotation sensor 84 may be, a two axis rotation sensor (or in further implementations, two rotation sensors), which acquires rotation measurements with respect to the vertical and crossline axes.

The particle motion sensors 80 of the seismic sensor unit 56-1 (and seismic sensor unit 56-3) each acquires measurements along the same measurement axis: such as two vertical particle motion measurements (called "$M_z$" below) along the z axis 59 (see FIG. 1). If particle motion sensor 80 is a 2C sensor, then the sensor may acquire two vertical and two crossline particle motion measurements (called "$M_y$," below) along the y axis 59 (see FIG. 1). The particle motion gradient may be determined by measuring the particle motion in the same direction separated by a short distance ($\Delta x$)) and taking the difference (e.g., $dVz/\Delta x$).

The $M_y$ crossline particle motion measurements and the $M_z$ vertical particle motion measurements may be described as follows:

$$M_y = \hat{v}_y, \text{ and} \qquad\qquad \text{Eq. 1}$$

$$M_z = \hat{v}_z. \qquad\qquad \text{Eq. 2}$$

In Eqs. 1 and 2, "$\hat{v}_y$," represents a measured crossline particle velocity containing a desired measured crossline particle velocity component (called "$v_y$") and a measured noise component (called "$N_y$"); and "$\hat{v}_z$" represents a measured vertical particle velocity, which contains a measured desired vertical particle velocity component (called "$v_z$") and a noise component (called "$N_z$"), as described below:

$$\hat{v}_y = v_y + N_y, \text{ and} \qquad \text{Eq. 3}$$

$$\hat{v}_z = v_z + N_z. \qquad \text{Eq. 4}$$

In general, the $N_y$ and $N_z$ noises are transverse vibration noises, which are introduced due to the towing of the streamer 30. Techniques and systems are disclosed herein to attenuate the $N_y$ and $N_z$ noises for purposes of recovering the true $v_y$ and $v_z$ particle velocities. It is noted that the $M_y$ and $M_z$ measurements may be made, but also the particle motion sensor 80 may acquire particle motion measurements along a different set or combination of axes, in accordance with further implementations. Thus, many variations are contemplated, which are within the scope of the claims.

The particle motion sensors 80 of the seismic sensor unit 56-1 (and seismic sensor unit 56-3) are separated by a distance (called "$\Delta x$" in FIG. 2), which is a smaller spacing than the $D_1$ spacing between the seismic sensor units 56-1 and 56-3. The particle motion sensors 80 may be distributed in pairs (e.g., the pairs in the seismic sensor units 56-1 and 56-2), and the $\Delta x$ spacing may be smaller than the wavelength of the transversal vibration noise in the streamer 30. The $\Delta x$ distance may be a distance ranging from 1 cm to approximately 62.5 centimeters (cm)); and the $D_1$ distance is the appropriate sampling distance for the seismic signal, such as 6.25 meters (m).

As depicted in FIG. 2, in accordance with some implementations, each seismic sensor unit 56 contains a pressure sensor 86, and in general, the seismic sensor units 56 (regardless of whether the seismic sensor unit 56 contains the rotation 84 and particle motion 80 sensors or not) are spaced apart by the $D_2$ distance. The $D_2$ distance may be a distance of approximately 3.125 m to properly sample the noise acquired by the pressure sensors 86. After removal of the noise, the pressure data may be decimated to 6.25 m, which is sufficient for alias-free sampling of the seismic wavefields and frequencies below 120 Hertz (Hz).

The pair (or pairs) of particle motion sensors 80 of each seismic sensor unit 56 (such as seismic sensor unit 56-1 or 56-3) may be used as a particle motion gradient sensor. In this manner, a finite difference approximation technique may be employed such that the particle motion gradient is derived by the quotient of the difference in the particle motion measurements between the two sensors 80 divided by the $\Delta x$ distance. For example, crossline particle motion measurements that are acquired by two crossline particle motion sensors 80 of a given seismic sensor unit 56 may be divided by the $\Delta x$ distance to obtain a corresponding change in the crossline particle motion with respect to the inline (x) direction. In other implementations, the streamer 30 may contain dedicated particle motion gradient sensors that are distributed along the length of the streamer 30. Thus, many variations are contemplated and are within the scope of the claims.

In general, considering Eqs. 1-4, the particle motion gradients may be described as follows:

$$\frac{\partial M_y}{\partial x} = \frac{\partial \hat{v}_y}{\partial x} = \frac{\partial v_y}{\partial x} + \frac{\partial N_y}{\partial x}, \text{ and} \qquad \text{Eq. 5}$$

-continued $$\frac{\partial M_z}{\partial x} = \frac{\partial \hat{v}_z}{\partial x} = \frac{\partial v_z}{\partial x} + \frac{\partial N_z}{\partial x}. \qquad \text{Eq. 6}$$

The rotation sensor 84, in accordance with some implementations, measures two components of rotation (or curl) of the particle velocity in the plane, which is perpendicular to the streamer 30:

$$R_y = \frac{\partial \hat{v}_x}{\partial z} - \frac{\partial \hat{v}_z}{\partial x}, \text{ and} \qquad \text{Eq. 7}$$

$$R_z = \frac{\partial \hat{v}_x}{\partial y} - \frac{\partial \hat{v}_y}{\partial x}, \qquad \text{Eq. 8}$$

where "$R_y$" represents the crossline component of rotation; and "$R_z$" represents the vertical component of rotation. As noted from Eqs. 7 and 8, the $R_y$ and $R_z$ rotation components are functions of the measured particle velocity of the seismic signal as well as the measured particle velocity due to the vibration.

The desired seismic wavefield signal is rotation free (curl free) in an acoustic medium. Due to this property, the $R_y$ and $R_z$ rotation components may be described as follows:

$$R_y = \frac{\partial N_x}{\partial z} - \frac{\partial N_z}{\partial x}, \text{ and} \qquad \text{Eq. 9}$$

$$R_z = \frac{\partial N_x}{\partial y} - \frac{\partial N_y}{\partial x}, \qquad \text{Eq. 10}$$

The vibration noise propagating in the streamer 30 has the following characteristics:

$$\left\| \frac{\partial N_z}{\partial x} \right\| \gg \left\| \frac{\partial N_x}{\partial z} \right\|, \text{ and} \qquad \text{Eq. 11}$$

$$\left\| \frac{\partial N_y}{\partial x} \right\| \gg \left\| \frac{\partial N_x}{\partial y} \right\|. \qquad \text{Eq. 12}$$

Therefore, the $R_y$ and $R_z$ rotation components may be approximated as follows:

$$R_y \approx -\frac{\partial N_z}{\partial x}, \text{ and} \qquad \text{Eq. 13}$$

$$R_z \approx -\frac{\partial N_y}{\partial x}. \qquad \text{Eq. 14}$$

Figure 3:
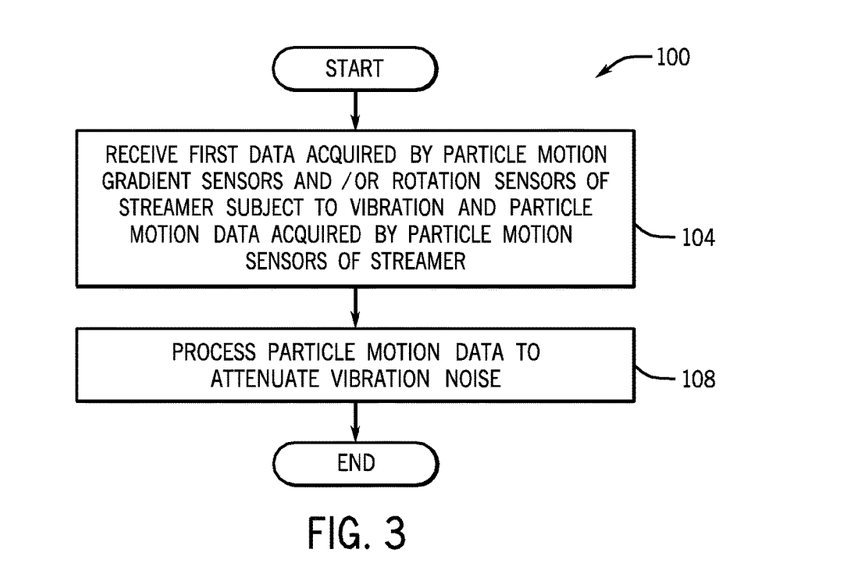
FIGS. 3, 4, 5, 6, 7 and 8 are flow charts depicting techniques that use particle motion gradient measurements and/or rotation measurements to attenuate vibration noise present in particle motion measurements.

In accordance with systems and techniques that are described herein, particle motion gradient and/or rotation measurements (acquired by corresponding sensors of the streamers) may be used for purposes of attenuating vibration noise that otherwise appears in the particle motion measurements that are acquired by particle motion sensors of the streamer. More specifically, referring to FIG. 3, in accordance with some implementations, a technique 100 includes receiving (block 104) first data acquired by particle motion gradient sensors and/or rotation sensors of a streamer that is subject to vibration. The technique includes processing particle motion data (acquired by particle motion sensors of the streamer) to attenuate vibration noise. In other words, the particle motion gradient sensor and/or rotation sensor measurements may be processed for purposes of attenuating the vibration noise that is otherwise present in the measurements that are acquired by the particle motion sensors 80.

In accordance with some implementations, both the rotation and particle motion gradient data may be used. In this manner, the spatial derivatives of the $v_y$ and $v_z$ particle motions may be described as follows:

$$\frac{\partial v_y}{\partial x} = \frac{\partial M_y}{\partial x} + R_z, \text{ and} \qquad \text{Eq. 15}$$

$$\frac{\partial v_z}{\partial x} = \frac{\partial M_z}{\partial x} + R_y. \qquad \text{Eq. 16}$$

Eqs. 15 and 16 contain in-line spatial derivatives of the desired seismic wavefield, which is well sampled at the $D_1$ spacing. Therefore, the seismic signal may be recovered by integrating the in-line derivatives in the direction of the streamer cable (i.e., in the inline (x) direction), as described below for the wavenumber domain:

$$V_y = \frac{1}{ik_x}\left(\frac{\partial M_y}{\partial x} + R_z\right), \text{ and} \qquad \text{Eq. 17}$$

$$V_z = \frac{1}{ik_x}\left(\frac{\partial M_z}{\partial x} + R_y\right). \qquad \text{Eq. 18}$$

Figure 4:
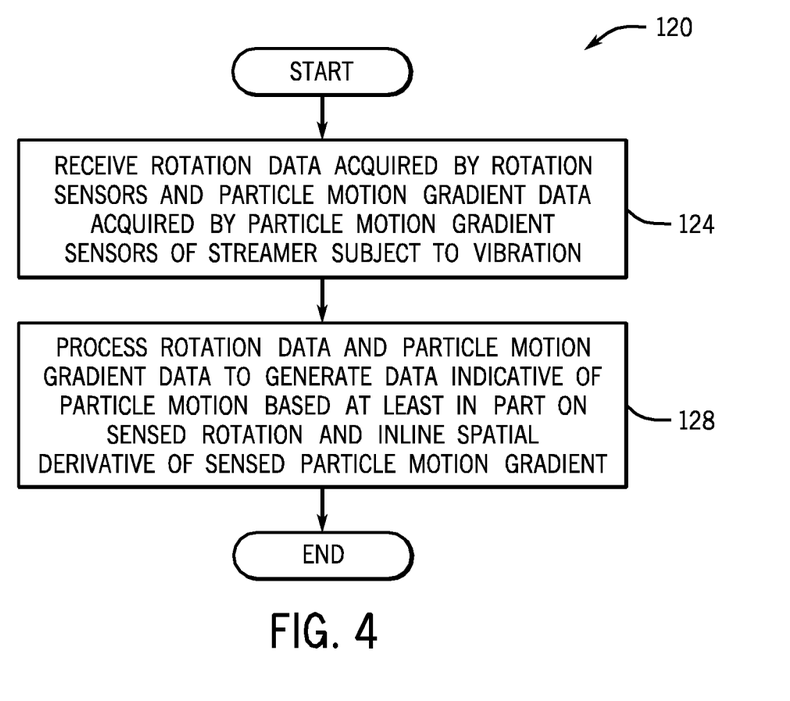

Thus, referring to FIG. 4, a technique 120 includes receiving (block 124) rotation data acquired by rotation sensors and particle motion gradient data acquired by particle motion gradient sensors of a streamer, which is subject to vibration. The technique 120 includes processing the rotation data and the particle motion gradient data to generate data indicative of particle motion based at least in part on the integration of sensed rotation and an inline spatial derivative of the sensed particle motion gradient, pursuant to block 128.

The particle motion gradient measurements may be used without rotation data for purposes of attenuating the vibration noise. In this manner, the particle motion gradient data may be used for purposes of interpolating the total particle motion signal, i.e., the vibration noise and the desired particle motion signal, so that the total interpolated signal may be processed to attenuate the vibration noise. More specifically, due to measurements of both the data and their gradients being available, a multichannel interpolation algorithm may be applied for purposes of reconstructing the total particle motion data from sparsely sampled measurements.

In this manner, the sampling spacing used by the multiple channel interpolation technique is at least twice the spacing used for single channel interpolation, i.e., interpolation from data samples only. The transversal vibration noise has a relatively narrow band wavenumber spectrum. Therefore, for reconstruction of the transversal vibration noise, the $D_1$ spacing may be selected to be larger than what is used for full band signals. Moreover, the $D_1$ spacing, in accordance with some implementations, may be non-uniform for purposes of facilitating better reconstruction of the wavenumber spectrum from sparsely spaced samples.

Figure 5:
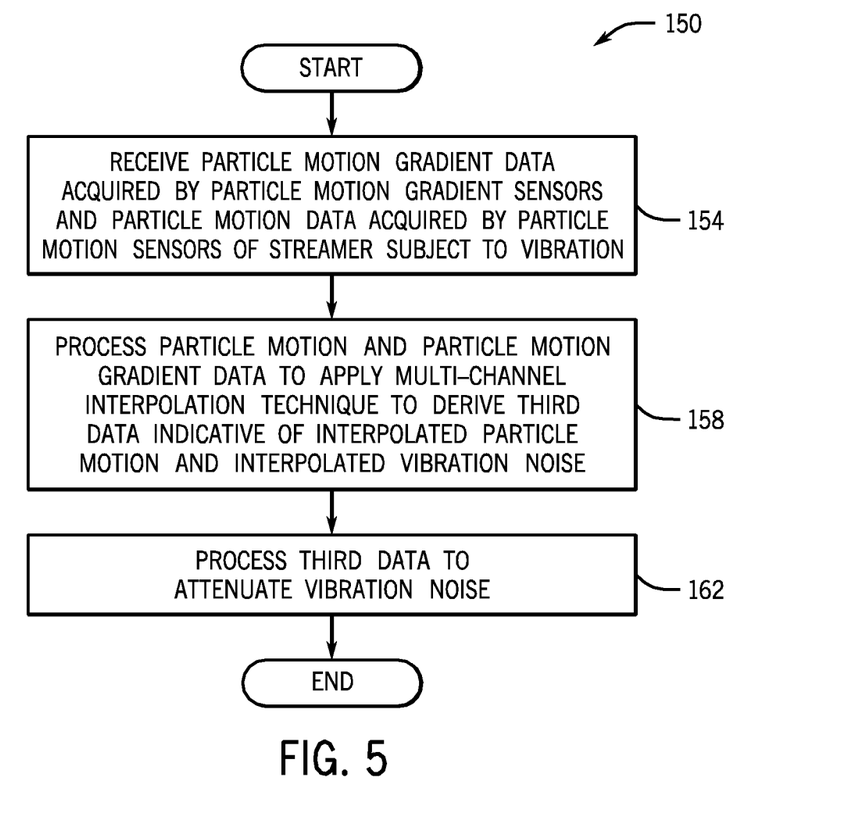

A multiple channel, matching pursuit-based technique may be used for purposes of processing the particle motion and particle motion gradient data, such as a multiple channel, matching pursuit-based technique, such as the Multi-channel Interpolation by Matching Pursuit (MIMAP). The MIMAP technique is generally disclosed in UK Patent Application No. GB 240122A, which was published on Dec. 17, 2008, and is hereby incorporated by reference in its entirety. Another interpolation technique that may be employed is disclosed in U.S. Patent Application Publication Serial No. 2010/0002541 A1, entitled, "INTERPOLATING SEISMIC DATA," which was published on Jan. 7, 2010, and is hereby incorporated by reference in its entirety. Other multichannel interpolation techniques may be employed, in accordance with other implementations Referring to FIG. 5, thus, a technique 150 in accordance with implementations disclosed herein includes receiving particle motion gradient data acquired by particle motion gradient sensors and particle motion data acquired by particle motion sensors of a streamer, which is subject to vibration, pursuant to block 154. The technique 150 includes processing (block 158) the particle motion and particle motion gradient data to apply a multi-channel interpolation technique to derive second data indicative of interpolated particle motion and interpolated vibration noise. The technique 150 includes processing (block 162) the second data to attenuate vibration noise.

The measured particle motion gradient may be used to attenuate the vibration noise by using the particle motion gradient measurement to derive a noise model that is then used for purposes of adaptive subtraction. More specifically, in accordance with some implementations, the particle motion gradient data may be assumed to indicate a transverse vibration noise, which may be converted into a vibration noise model. In this manner, the gradient data may be decomposed in frequency. For each frequency, the corresponding spectral component may be scaled by a wavelength according to a frequency-wavenumber dispersion relationship of the vibration noise in the streamer 30 at each frequency. Thus, by scaling the spectral components by the corresponding scaling factor that is derived from this dispersion relationship, a model of the vibration noise may be obtained.

It is noted that if there is some gradient of seismic signal recorded, this gradient is scaled by a relatively shorter wavelength and remains relatively weak. Therefore, the resulting noise model may be distinctly separated from the spectral energy associated with the seismic signal and may be used for adaptive filtering, direct subtraction, and so forth, for purposes of attenuating the vibration noise. In accordance with some implementations, for a streamer that has a relatively low bending stiffness, the vibration noise propagation may be substantially the same at all frequencies. For these implementations, the frequency-dependent scaling may be achieved by simple time integration.

Figure 6:
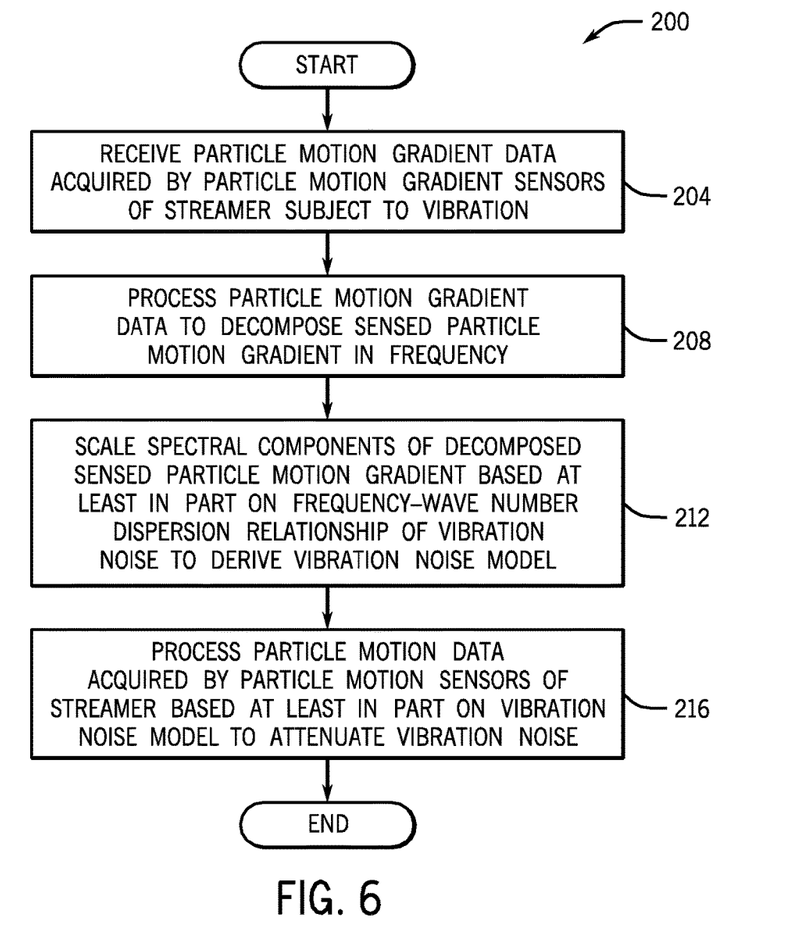

Thus, referring to FIG. 6, a technique 200 in accordance with implementations includes receiving (block 204) particle motion gradient data acquired by particle motion gradient sensors of a streamer, which is subject to vibration. The technique 200 includes processing the particle motion gradient data to decompose (block 208) the sensed particle motion gradient in frequency. The spectral components of the decomposed sensed particle motion gradient are scaled (block 212) based at least in part on a frequency-wavenumber dispersion relationship of the vibration noise to derive a vibration noise model. The technique includes processing (block 216) data indicative of particle motion acquired by particle motion sensors of the streamer based at least in part on the vibration noise model to attenuate vibration noise.

The rotation data acquired by the rotation sensor 84 may be used without particle motion gradient data for purposes of attenuating vibration noise from the particle motion measurements. In this regard, as set forth in Eqs. 13 and 14, the rotation data provides a gradient of the vibration noise, which may be used for interpolation using a multiple channel interpolation technique. More specifically, the $R_y$ and $R_z$ rotation measurements provide gradients of the vibration noise, and the particle motion measurements (see Eqs. 3 and 4) are functions of the vibration noise. It is noted that the interpolation does not provide the gradient of the seismic signal. However, the seismic signal is not interpolated, as the seismic signal is already properly sampled given the $D_1$ spacing (see FIG. 2).

Figure 7:
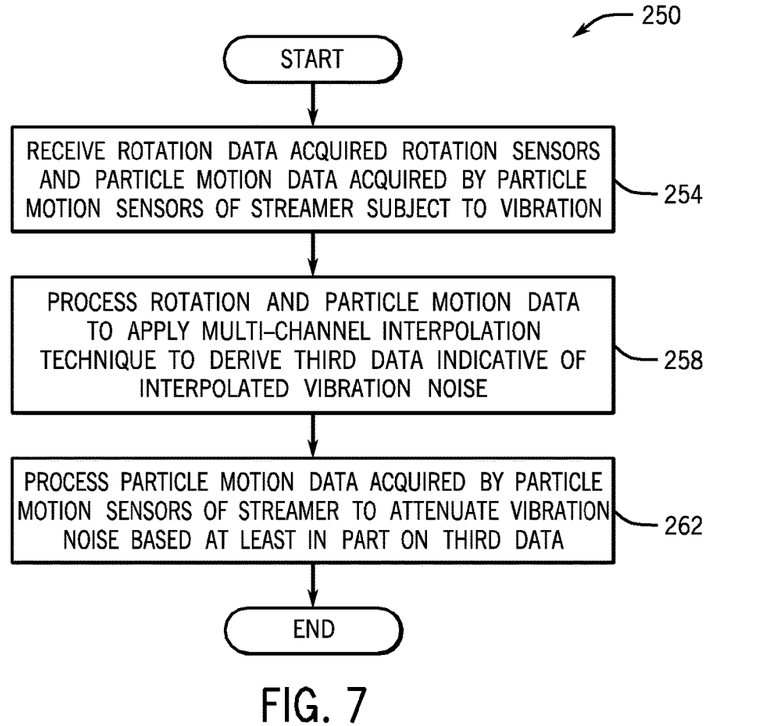

Referring to FIG. 7, thus, pursuant to a technique 250, rotation data acquired by rotation sensors and particle motion data acquired by particle motion sensors of a streamer that is subject to vibration noise are received (block 254) and processed (block 258) to apply a multi-channel interpolation technique to derive second data indicative of interpolated vibration noise. The technique 250 includes processing (block 262) particle motion data acquired by particle motion sensors of the streamer to attenuate vibration noise-based at least in part on second data. The vibration noise may then be filtered (pursuant to block 262) from the sensed particle motion based at least in part on the interpolated vibration noise.

Figure 8:
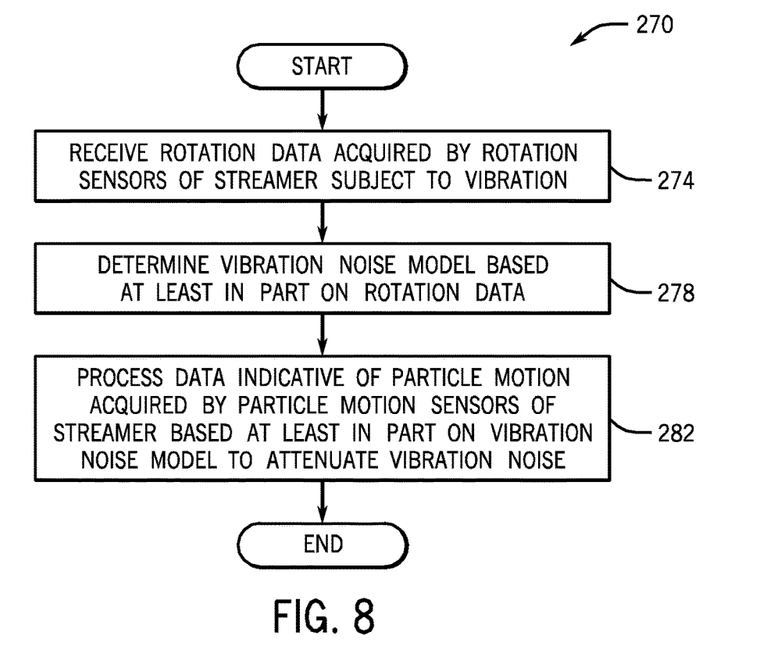

The rotation measurement may be also be used for purposes of deriving a noise model for adaptive subtraction, as the rotation sensor indicates the vibration noise. Similar to the above-technique of deriving a noise model from gradient measurements, the rotation measurements may be used, with the additional advantage that the signal is not recorded and is not present in the noise model. Thus, referring to FIG. 8, a technique 270 in accordance with implementations disclosed herein includes receiving (block 274) rotation data acquired by rotation sensors of a streamer that is subject to vibration. A vibration noise model is determined (block 278) based at least in part on the rotation data. The technique 270 includes processing (block 282) particle motion data acquired by particle motion sensors of the streamer to attenuate vibration noise.

Figure 9:
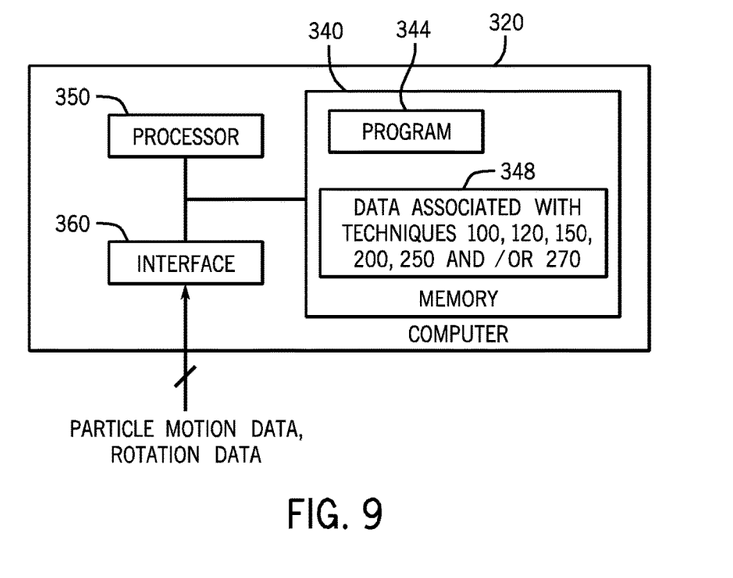
FIG. 9 is a schematic diagram of a data processing system.

Referring to FIG. 9, in accordance with some implementations, a processor-based machine, such as a computer 320, contains a processor 350 that processes data acquired by sensors of a streamer to perform at least some parts of one or more of the techniques that are disclosed herein for such purposes as processing sensor data acquired by particle motion gradient sensors, particle motion sensors and/or rotation sensors of a streamer subject to vibration; processing sensor data to attenuate vibration in particle motion measurements; processing sensor data acquired by particle motion sensors and particle motion gradient sensors to attenuate vibration noise in particle motion measurements; processing sensor data acquired by particle motion sensors and particle motion gradient sensors to apply a multiple channel interpolation technique to attenuate vibration noise in particle motion measurements; attenuating vibration noise from an interpolated sensed particle motion based at least in part on interpolated vibration noise; processing sensor data acquired by particle motion sensors and particle motion gradient sensors to decompose a sensed particle motion gradient in frequency and scale spectral components of decomposed sensed particle motion gradient based at least in part on a frequency-wavenumber dispersion relationship of vibration noise to derive a vibration noise model and use the vibration noise model to attenuate vibration noise in particle motion measurements; processing sensor data acquired by particle motion sensors and rotation sensors of a streamer to generate data indicative of vibration noise sensed by the particle motion sensors and attenuate the vibration noise based at least in part on the second data; processing sensor data acquired by particle motion sensors and rotation sensors to derive data indicative of interpolated vibration noise and attenuate vibration noise from particle motion measurements based at least in part on the interpolated vibration noise; determining a vibration noise model based at least in part on sensor data acquired by rotation sensors of a streamer and using the determined vibration noise model to attenuate vibration noise from particle motion measurements; and so forth.

The processor 350 may be formed from one or more microprocessors and/or microprocessor processing cores. The processor 350 may be located on a streamer 30 (see FIG. 1), located on the vessel 20 (see FIG. 1), located at a land-based processing facility, etc., depending on the particular implementation.

As depicted in FIG. 9, the processor 350 may be coupled to a communication interface 360 for purposes of receiving seismic data, such as data indicative of pressure measurements; particle motion measurements; particle motion gradient measurements; rotation measurements; and so forth. As examples, the communication interface 360 may be a Universal Serial Bus (USB) interface, a network interface, a removable media interface (a flash card, CD-ROM interface, etc.) or a magnetic storage interface (IDE or SCSI interfaces, as non-limiting examples). Thus, the communication interface 360 may take on numerous forms, depending on the particular implementation.

In accordance with some implementations, the processor 350 is coupled to a memory 340, which stores program instructions 344, which when executed by the processor 350, may cause the processor 350 to perform various tasks of one or more of the techniques that are disclosed herein, such as the techniques 120, 150, 200, 250 and/or 270. It is noted that the memory 340 is a non-transitory memory and may take on numerous forms, such as semiconductor storage, magnetic storage, optical storage, phase change memory storage, capacitor-based storage, etc., depending on the particular implementation. Furthermore, the memory 340 may be formed from more than one of these non-transitory memories. When executing the program instructions 344, the processor 340 may also store preliminary, intermediate and/or final results obtained via the execution of the program instructions 344 as data 348 in the memory 340.

It is noted that the computer 320 is merely one out of many possible architectures for a data processing system that may be employed to process the data acquired by sensors of the streamer, in accordance with the techniques that are disclosed herein. Moreover, the computer 320 is represented in a simplified form, as the computer 320 may have various other components (display to display initial, intermediate or final results of the system's processing), as can be appreciated by the skilled artisan. The computer 320 may be a distributed processing system that has components distributed at different locations. Thus, many variations are contemplated and are within the scope of the claims.

Various combinations of embodied features have been disclosed herein, and those skilled in the art, having the benefit of this disclosure, will appreciate numerous modifications and variations therefrom are envisioned as being within the scope of various present or subsequent claims.

What is claimed is:

1. A method comprising:

receiving first data acquired by at least one particle motion gradient sensor or at least one rotation sensor of a streamer, the streamer being subject to vibration due to towing of the streamer;

receiving second data representing a particle motion measurement acquired by at least one particle motion sensor of the streamer, wherein the particle motion measurement represents a summation of at least a particle motion component and a vibration noise component; and processing the second data in a processor-based machine to, based at least in part on the first data, attenuate the vibration noise component to generate third data representing the particle motion component, wherein the first data comprises data acquired by the at least one particle motion gradient sensor, wherein the processing includes applying a multi-channel interpolation technique to derive data indicative of an interpolated particle motion and an interpolated vibration noise and attenuating the vibration noise based at least in part on the interpolated vibration noise.

2. The method of claim 1, wherein the particle motion gradient sensor comprises a pair of particle motion sensors, the method further comprising:

using the pair of particle motion sensors to derive an indication of a particle motion gradient for the at least one gradient sensor.

3. The method of claim 1, wherein the processing comprises integrating an inline spatial derivative of a measurement acquired by the at least one particle motion gradient sensor.

4. The method of claim 1, wherein the processing comprises:

determining a vibration noise model based on a particle motion gradient sensed by the at least one particle motion gradient sensor; and using the vibration noise model to attenuate the vibration noise sensed by the at least one particle motion sensor.

5. The method of claim 4, wherein the determination of the vibration noise model comprises:

processing the particle motion data to decompose a particle motion gradient sensed by the at least one particle motion gradient sensor in frequency; and scaling spectral components of the decomposed sensed particle motion gradient based at least in part on a frequency-wavenumber dispersion relationship of vibration noise to derive the vibration noise model.

6. A method of claim 1, wherein the first data comprises data acquired by the at least one rotation sensor.

7. The method of claim 6, wherein the processing comprises:

applying a multiple channel interpolation technique to derive data indicative of interpolated sensed vibration noise; and the attenuating comprises attenuating the vibration noise based at least in part on the interpolated vibration noise.

8. The method of claim 6, wherein the processing comprises determining a vibration noise model based at least in part on rotation sensed by the at least one rotation sensor; and wherein the attenuation of the vibration noise is based at least in part on the vibration noise model.

9. An apparatus comprising:

an interface to:

receive first data acquired by at least one particle motion sensor or at least one rotation sensor of a streamer;

receive second data representing a particle motion measurement acquired by at least one particle motion sensor of the streamer, wherein the particle motion measurement represents a summation of at least a particle motion component and a vibration noise component; and a processor to process the second data to, based at least in part on the first data, attenuate the vibration noise component to generate third data representing the particle motion component, wherein the first data includes particle motion data indicative of the seismic energy and sensed vibration noise, and the processing comprises attenuating the sensed vibration noise, wherein the processor is further configured to apply a multiple channel interpolation technique to derive data indicative of interpolated sensed vibration noise and attenuate the vibration noise based at least in part on the interpolated vibration noise.

10. The apparatus of claim 9, wherein the at least one particle motion sensor comprises a pair of particle motion gradient sensors; and wherein the pair of particle motion gradient sensors is used to derive an indication of a gradient for the at least one particle motion gradient sensor.

11. The apparatus of claim 9, wherein the first data comprises data acquired by the at least one particle motion sensor.

12. The apparatus of claim 11, wherein the processor is further adapted to:

apply a multi-channel interpolation technique to derive data indicative of interpolated particle motion and interpolated vibration noise; and attenuate the vibration noise based at least in part on the interpolated vibration noise.

13. The apparatus of claim 11, wherein the processor is further adapted to:

determine a vibration noise model based on the first data; and use the vibration noise model to attenuate the vibration noise.

14. The apparatus of claim 13, wherein the processor is further adapted to:

process the first data to decompose a particle motion gradient in frequency; and scale spectral components of the decomposed sensed particle motion gradient based at least in part on a frequency-wavenumber dispersion relationship of the vibration noise to derive the vibration noise model.

15. The apparatus of claim 9, wherein the processor is further adapted to:

determine a vibration noise model based at least in part on rotation sensed by the at least one rotation sensor; and attenuate the vibration noise based at least in part on the vibration noise model.

* * * * *